United States Patent
Choi et al.

(10) Patent No.: US 7,260,950 B2
(45) Date of Patent: *Aug. 28, 2007

(54) AIR CONDITIONING SYSTEM AND METHOD OPERATING SUITABLY TO USER'S CHARACTERISTICS

(75) Inventors: Ho Seon Choi, Seoul (KR); Gi Seop Lee, Incheon-si (KR); Kwan Ho Yum, Seoul (KR); Youn Ho Yoo, Seoul (KR); Deok Huh, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 11/341,601

(22) Filed: Jan. 30, 2006

(65) Prior Publication Data

US 2006/0123814 A1   Jun. 15, 2006

Related U.S. Application Data

(63) Continuation of application No. 10/424,865, filed on Apr. 29, 2003, now Pat. No. 7,111,468.

(30) Foreign Application Priority Data

Oct. 2, 2002 (KR) ............................... 2002-60228

(51) Int. Cl.
  *F25D 17/00* (2006.01)
(52) U.S. Cl. ........................................ 62/180; 62/259.3
(58) Field of Classification Search .......... 62/177–180, 62/208, 237, 259.2, 126
See application file for complete search history.

(56) References Cited

U.S. PATENT DOCUMENTS

| | | | |
|---|---|---|---|
| 5,172,856 A | 12/1992 | Tanaka et al. | |
| 6,125,636 A | 10/2000 | Taylor et al. | |
| 6,131,645 A | 10/2000 | Barr | |
| 6,198,394 B1* | 3/2001 | Jacobsen et al. | ......... 340/573.1 |
| 6,311,089 B1* | 10/2001 | Mann et al. | .................. 607/30 |
| 6,508,831 B1 | 1/2003 | Kushnir | |
| 6,527,796 B1 | 3/2003 | Magovern | |

(Continued)

FOREIGN PATENT DOCUMENTS

JP   57-37642   3/1982

(Continued)

OTHER PUBLICATIONS

English Language Abstract of KR 10-0182529.

*Primary Examiner*—Mohammad M. Ali
(74) *Attorney, Agent, or Firm*—Greenblum & Bernstein, P.L.C.

(57) ABSTRACT

There is provided an air conditioning system and method for operating an air conditioner according to a user's physical response to external conditions. The air conditioning system includes: an indoor environment sensing unit/a personal characteristic value reception unit for measuring an indoor environment and the user's physical status so as to obtain information used to operate an air conditioner; a control unit including at least a microprocessor, for finding out personal characteristic values which are used to evaluate the user's physical status on the basis of information inputted from the personal characteristic value reception unit; and a driving unit controlled by the control unit, for promptly enhancing the user's physical status.

11 Claims, 5 Drawing Sheets

U.S. PATENT DOCUMENTS

| | | |
|---|---|---|
| 6,543,247 B2 | 4/2003 | Strauss |
| 6,558,413 B2 | 5/2003 | Augustine et al. |
| 6,594,523 B1 * | 7/2003 | Levine .................. 607/30 |
| 6,636,157 B1 | 10/2003 | Sato |
| 6,641,533 B2 * | 11/2003 | Causey et al. ............ 600/300 |
| 6,685,633 B2 * | 2/2004 | Albert et al. ............ 600/300 |
| 6,692,518 B2 | 2/2004 | Carson |
| 6,705,990 B1 * | 3/2004 | Gallant et al. ............ 600/300 |
| 6,761,682 B2 | 7/2004 | Goldberg et al. |
| 6,832,113 B2 * | 12/2004 | Belalcazar ............... 607/23 |
| 6,930,661 B2 * | 8/2005 | Uchida et al. ............ 345/87 |

FOREIGN PATENT DOCUMENTS

| | | |
|---|---|---|
| JP | 2296527 | 12/1990 |
| JP | 6159763 | 6/1994 |
| JP | 7237429 | 9/1995 |
| JP | 10-5357 A * | 1/1998 |
| KR | 10 0182529 | 12/1998 |

* cited by examiner

AIR CONDITIONING SYSTEM AND METHOD OPERATING SUITABLY TO USER'S CHARACTERISTICS

The present application is a Continuation Application of U.S. patent application Ser. No. 10/424,865, filed Apr. 29, 2003, now U.S. Pat. No. 7,111,468 the contents of which is expressly incorporated herein by reference in it's entirety.

BACKGROUND OF THE INVENTION

1. Field of the Invention

The present invention relates to an air conditioning system and method, and more particularly, to an air conditioning system and method operating suitably to a user's characteristics, which can make living environment suitable for user's status.

2. Description of the Related Art

In a conventional air conditioning system and method, indoor temperature and humidity vaguely intended by a user are set as target values, and the air conditioning system forcedly operates to reach the set temperature and humidity.

In such a conventional air conditioning system, the set target values may not be suitable for the user's physical environment. Particularly, it is difficult for a nonprofessional user to know accurate temperature, humidity, wind amount and wind direction, which are suitable for the user oneself. Accordingly, in case the set target values are excessively high or low temperature and excessively high or low humidity, a problem of injuring the user's health may be often caused.

SUMMARY OF THE INVENTION

Accordingly, the present invention is directed to an air conditioning system and method that substantially obviates one or more problems due to limitations and disadvantages of the related art.

It is an object of the present invention to provide an air conditioning system and method, which can make living environment suitable for user's physical status by quantitatively measuring the user's physical status.

It is another object of the present invention to provide an air conditioning system and method, which can make living environment suitable for the user and beneficial to health by using various indexes indicating the user's physical status.

To achieve the above objects, in accordance with an aspect of the present invention, there is provided an air conditioning system operating suitably to a user's characteristics, which comprises: an indoor environment sensing means for measuring an indoor environment including a temperature; a personal characteristic value reception means for measuring the user's heart rate and/or skin temperature and/or skin electrical activity's amplitude so as to detect the user's physical status; a control means including at least a microprocessor, for finding out personal characteristic values, the personal characteristic values being used to evaluate the user's physical status on the basis of information inputted from the personal characteristic value reception means; and a driving means controlled by the control means, for driving at least a compressor and/or an indoor fan so as to promptly enhance the user's status.

In accordance with an embodiment of the present invention, there is provided an air conditioning system operating suitably to a user's characteristics, which comprises: an indoor environment sensing means/a personal characteristic value reception means for measuring an indoor environment and the user's physical status so as to obtain information used to operate an air conditioner; a control means including at least a microprocessor, for finding out personal characteristic values, the personal characteristic values being used to evaluate the user's physical status on the basis of information inputted from the personal characteristic value reception means; and a driving means controlled by the control means, for promptly enhancing the user's physical status.

In an aspect of the present invention, there is an air conditioning method operating suitably to a user's characteristics, which comprises the steps of: measuring the user's heart rate and/or skin temperature and/or skin electrical activity; calculating weight values/value of the skin temperature and/or the heart rate and/or the heart rate variability and/or the skin electrical activity's amplitude; quantitatively calculating personal characteristic values on the basis of the respective weight values; and operating the air conditioner differently according to the personal characteristic values, thereby promptly enhancing the user's physical status.

In another embodiment of the present invention, there is provided an air conditioning method operating suitably to a user's characteristics, which comprises the steps of: measuring data indicating a physical status of the user who operates an air conditioner; calculating the user's current personal characteristic values using the measured data; and operating the air conditioner according to the calculated personal characteristic values, thereby promptly enhancing the user's physical status.

According to the present invention, the air conditioner can operate promptly and suitably for the user's physical response and characteristics.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the attached drawings. The foregoing description is intended to be illustrative and does not limit the scope and spirit of the present invention.

Figure 1:
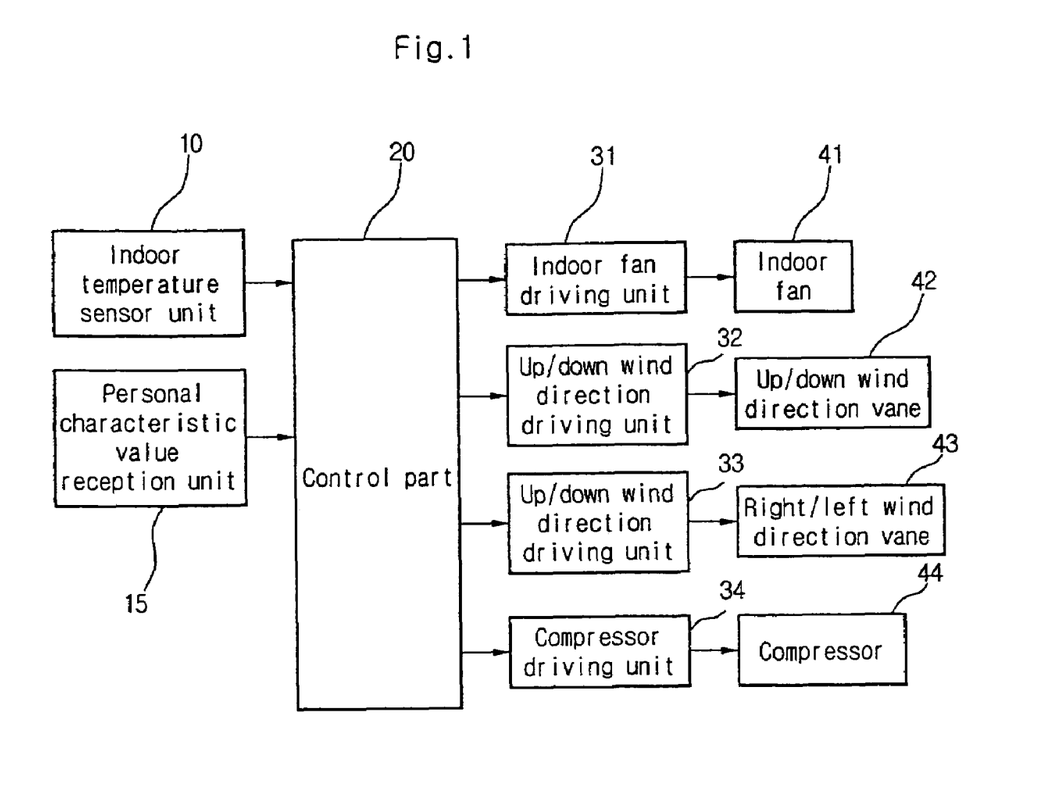
FIG. 1 is a block diagram of an air conditioning system in accordance with the present invention, which operates suitably for a user's characteristics.

FIG. 1 is a block diagram of an air conditioning system in accordance with the present invention, which operates suitably for a user's characteristics.

Referring to FIG. 1, the air conditioning system of the present invention includes: a detecting part for measuring characteristic values which indicate an indoor temperature and a user's physical status; a driving part for adjusting an indoor temperature and a wind amount according to the characteristic values; and a control part 20 for controlling the driving part according to external conditions measured by the detecting part.

Describing the respective parts in detail, the detecting part includes an indoor temperature sensor unit 10 for measuring an indoor temperature, and a personal characteristic value reception unit 15 for measuring the user's personal characteristic values. The driving part includes: an indoor fan 41 for adjusting a wind amount and an indoor fan driving unit 31 for driving the indoor fan 41; an up/down wind direction vane 42, for adjusting a wind direction upward and downward and an up/down wind direction driving unit 32 for controlling the up/down wind direction vane 42; a right/left wind direction vane 43 for adjusting a wind direction right and left and a right/left wind direction driving unit 33 for controlling the right/left wind direction vane 43; and a compressor 44 for adjusting an air cooling capacity and a compressor driving unit 34 for controlling the compressor 44. Meanwhile, the air cooling capacity can be adjusted by an expansion value installed in an air conditioner.

Additionally, the control part 20 is provided at a control board having at least a microprocessor thereon.

Meanwhile, the indoor temperature sensor unit 10 can sense an entire indoor environment, including an indoor humidity as well as the indoor temperature, in which the humidity is measured using a wet and dry bulb thermometer.

Describing an operation of the air conditioning system constructed as above, predetermined information on the user's body is inputted through the personal characteristic value reception unit 15. Then, the user's characteristic values are checked using the information on the user's body, and the driving part is controlled according to the characteristic values by the control part 20. At this time, the control part 20 is informed of the indoor temperature information inputted from the indoor temperature sensor unit 10 as information on a current indoor environment. Respective elements of the driving part are actively controlled by the control part 20.

In addition, the wind direction can be adjusted according to information on the user's stature previously inputted, or information detected by predetermined sensors.

The information on the indoor environment, which is provided from the indoor temperature sensor unit 10, includes at least the information on the temperature and can further include humidity information provided from the wet and dry bulb thermometer. Particularly, the indoor temperature sensor unit 10 can also contain units for measuring information on the indoor environment, such as humidity, wind amount and wind direction, as well as the indoor temperature. At this time, the indoor temperature sensor unit 10 can be called an "indoor environment sensor unit".

Meanwhile, it is desirable that the information on the user's body, used to measure the personal characteristic values at the personal characteristic value reception unit 15, be based on the user's pulse, skin temperature, skin electrical activity and the like, and three points of the user's body be measured. However, even if the information is measured at two or less points, it does not affect a basic effect of the present invention, merely causing a difference in reliability.

The indoor temperature sensor unit 10 is installed in an indoor air suction hole of the air conditioner, such that the indoor temperature is detected more accurately.

In addition, the up/down wind direction vane 42 and the right/left wind direction vane 43 are elements capable of rotating or guiding the wind direction properly, and can be replaced with other structures except which are capable of changing the wind direction.

Figure 2:
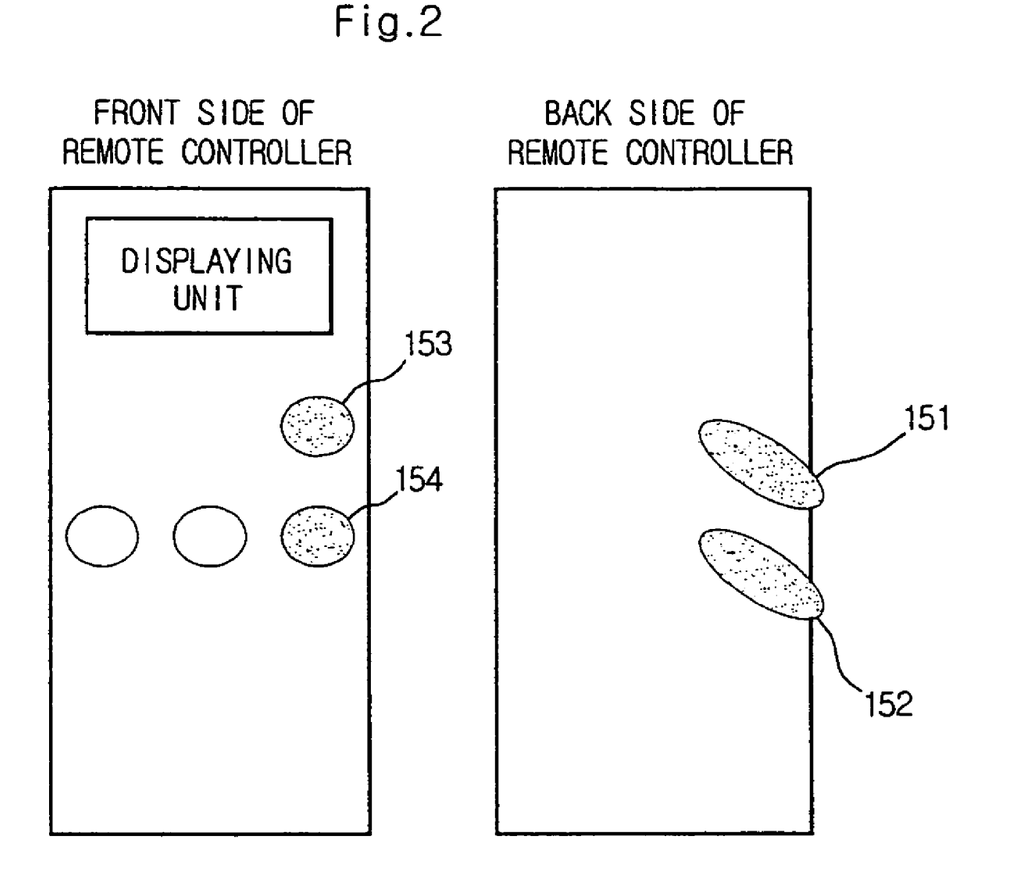
FIG. 2 illustrates a first embodiment of the personal characteristic value reception unit in accordance with the present invention.

FIG. 2 illustrates a first embodiment of the personal characteristic value reception unit in accordance with the present invention.

Referring to FIG. 2, among three sensing points that the personal characteristic value reception unit 15 needs, two sensing points can be formed on the back side of a remote controller and the remaining sensing point can be formed on the front side thereof.

In more detail, in order to accurately measure the user's pulse, a first sensing unit 151 and a second sensing unit 152 can be formed on the back side of the remote controller. The remaining sensing point can be an operation start button 153 or a pleasant air conditioning button 154, which is formed on the front side of the remote controller.

In case the personal characteristic value reception unit 15 is formed on the operation start button 153, the user's personal characteristic values are automatically measured every when the user operates the remote controller, such that the air conditioner operates suitably according to the user's characteristic values. In addition, in case the personal characteristic value reception unit 15 is formed on the pleasant air conditioning button 154, the user's pulse, skin temperature and skin electrical activity can be noticed by pressing the pleasant air conditioning button 154 when the user wants to operate the air conditioner in a pleasant mode. Meanwhile, in case the personal characteristic value reception unit 15 is formed on both the operation start button 153 and the pleasant air conditioning button 154, the pleasant operation can be performed by pressing the operation start button 153 when the air conditioner starts to operate, and also the air conditioner is allowed to operate in the pleasant mode by pressing the pleasant air conditioning button 154 after the air conditioner operates.

Further, the first and second sensing units 151 and 152 formed on the back side of the remote controller are arranged in one row in a direction in which fingers are arranged. When the user grasps the remote controller, the personal characteristic values are easily measured and reflected to achieve the pleasant operation of the air conditioner.

In the personal characteristic value reception unit 15, a third sensing unit can be installed in the same row as the first and second sensing units 151 and 152, which does not affect the operation of the present invention.

Figure 3:
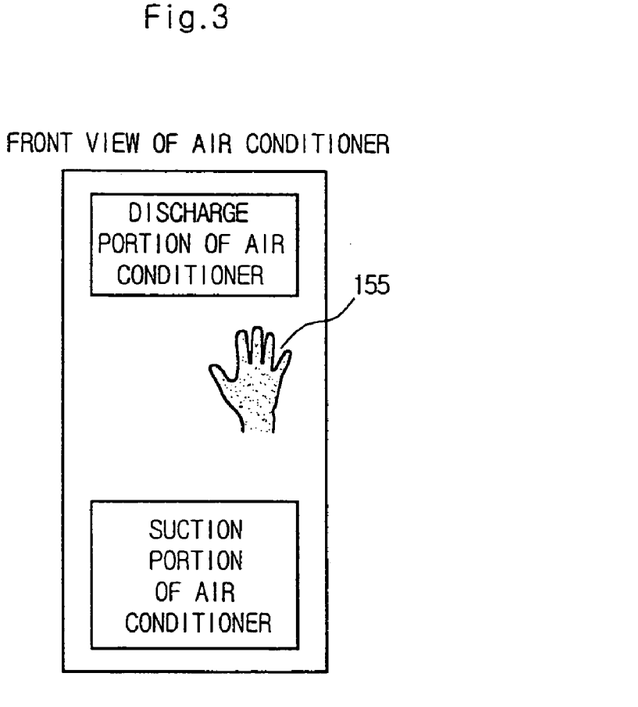
FIG. 3 illustrates a second embodiment of the personal characteristic value reception unit in accordance with the present invention.

FIG. 3 illustrates a second embodiment of the personal characteristic value reception unit in accordance with the present invention.

Referring to FIG. 3, a unified sensing unit 155 is installed at the front side of the air conditioner body. The unified sensing unit 155 includes at least three personal characteristic value reception units 15 and senses the personal characteristic values with reliability.

In addition, it is desirable that the unified sensing unit 155 be formed in a palm shape so that the user can easily touch it. In order for the user to easily grasp the unified sensing unit 155, the unified sensing unit 155 can also be formed in a bar shape protruded from an outer periphery of the air conditioner. The bar-shaped equipment also includes the personal characteristic value reception units 15 formed at three sensing points and thus can measure the user's physical status with reliability. The unified sensing unit 155 can be formed on the lateral or back side of the air conditioner or any places, as well as the front side.

Figure 4:
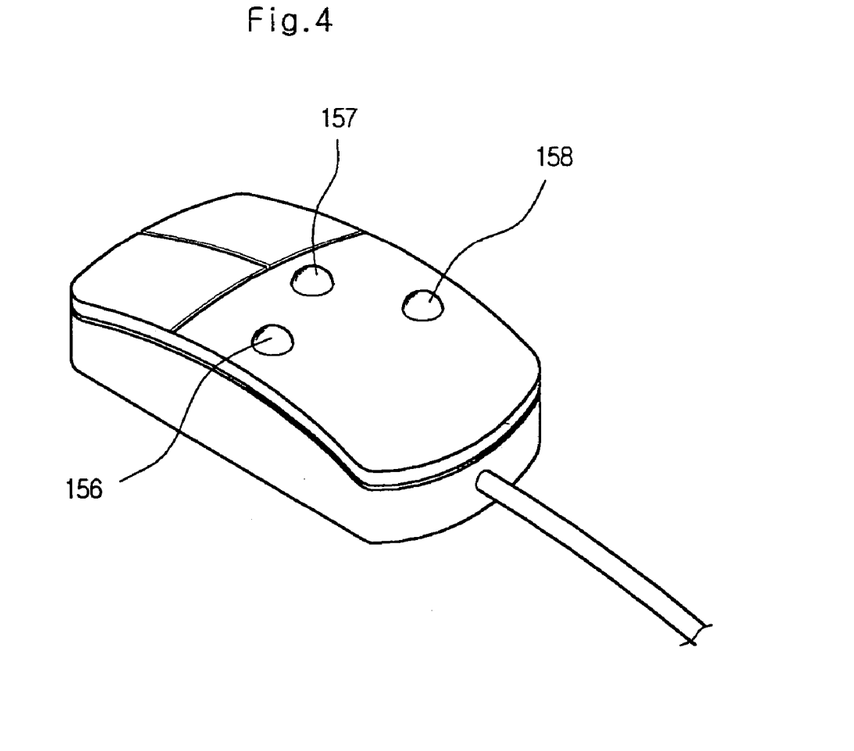
FIG. 4 illustrates a third embodiment of the personal characteristic value reception unit in accordance with the present invention.

FIG. 4 illustrates a third embodiment of the personal characteristic value reception unit in accordance with the present invention.

Referring to FIG. 4, the third embodiment is applicable in case a computer is connected to the air conditioner and controls its operation. In case the computer controls the air conditioner, the personal characteristic value reception unit 15 which can sense the user's personal characteristic values is formed at three or more points of an upper surface of a mouse. The personal characteristic value reception unit 15 includes a first reception unit 156, a second reception unit 157 and a third reception unit 158.

Except that the air conditioner is controlled through the computer and the mouse communicating therewith, the whole control of the air conditioner is the same as that of FIGS. 2 and 3.

Figure 5:
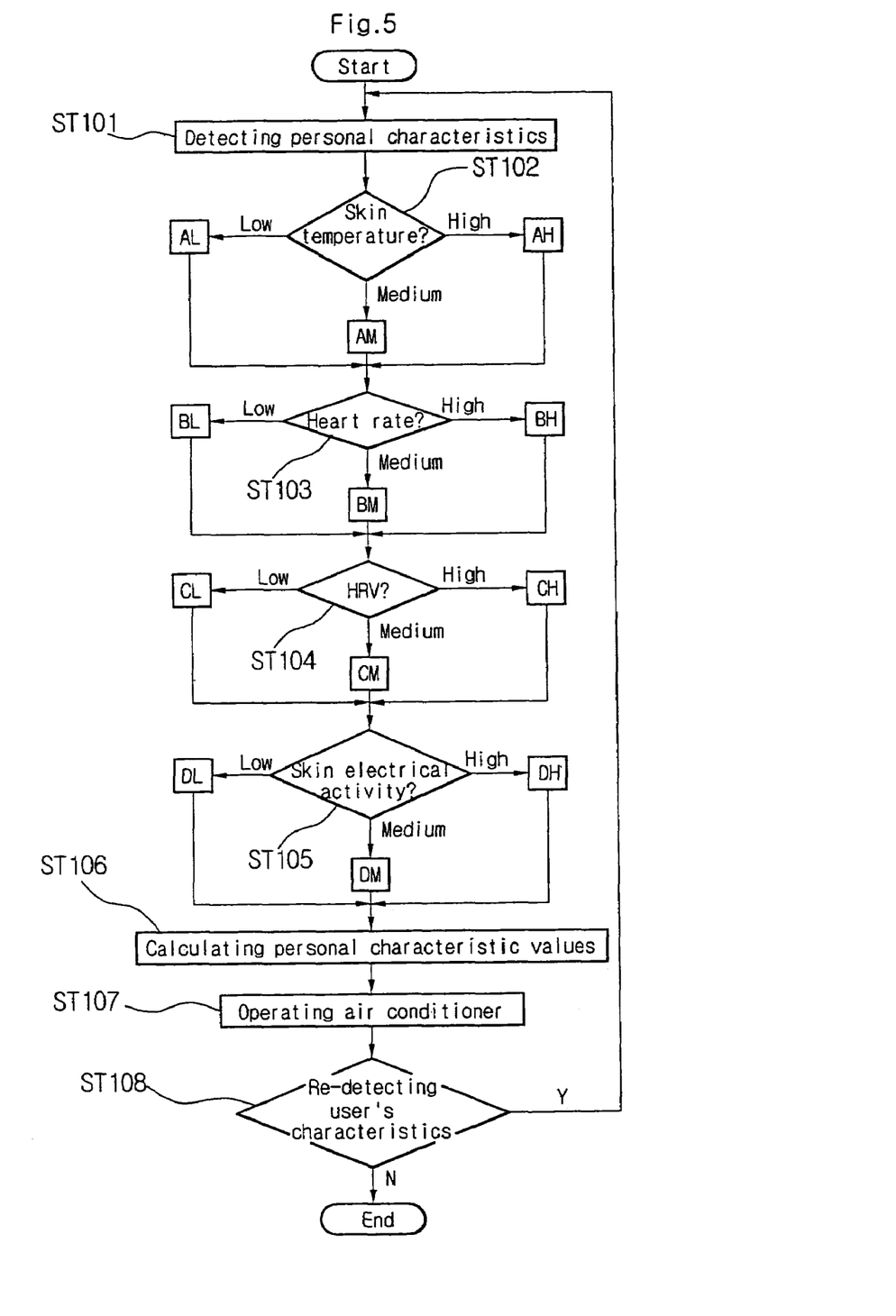
FIG. 5 is a flowchart showing an air conditioning method operating suitably for a user's characteristics in accordance with the present invention.

FIG. 5 is a flowchart showing an air conditioning method operating suitably to a user's characteristics in accordance with the present invention.

Referring to FIG. 5, first, information on the personal characteristic values is detected at the personal characteristic value reception unit 15 (ST101).

Meanwhile, the information includes at least a heart rate and/or a skin temperature and/or a skin electrical activity. The personal characteristic values are transferred to the control part (20 in FIG. 1) and calculated as a whole.

Hereinafter, a process of calculating weight values of the personal characteristic values will be described in detail.

First, the skin temperature is divided into a "high" level (AH), a "low" level (AL) and a "medium" level (AM). Through the division, the factors AH, AL and AM are applied as a weight value for determining the personal characteristic values (ST102).

In more detail, describing the relationship between the user's skin temperature and the air conditioner's operation status, in case the skin temperature is high, the air conditioner operates toward a low indoor temperature so as to rapidly cool the skin temperature. In case the skin temperature is low, the air conditioner operates toward a high indoor temperature so that an air cooling operation is not needed or a heating operation is needed. In case the skin temperature is medium, the air conditioner is not needed to operate since the user feels pleasant in the given situation.

After determining the air conditioner's operation status according to the user's skin temperature, the user's heart rate is divided into a "high" level (BH), a "low" level (BL) and a "medium" level (BM). By applying a weight value differently according to the user's heart rate, the factors BH, BL and BM are used as a weight value for determining the personal characteristic values (ST103).

In more detail, describing the variation of the personal characteristic values according to the user's heart rate, in case the heart rate is high, it is desirable that the air conditioner operate differently according to the weight value of the heart rate, since it is determined that the user feels hot due to a high temperature of adjacent environment or an increase of blood pressure caused by stress and the like.

After the variation of the personal characteristic values is reflected on the operation of the air conditioner according to the heart rate, a heart rate variability is divided into a "CH" (in case the heart rate variability is high), a "CL" (in case the heart rate variability is low), and a "CM" (in case the heart rate variability is medium). By applying a weight value differently according to the user's heart rate variability, the factors CH, CL and CM are used as a weight value for determining the personal characteristic values (ST104).

Figure 6:
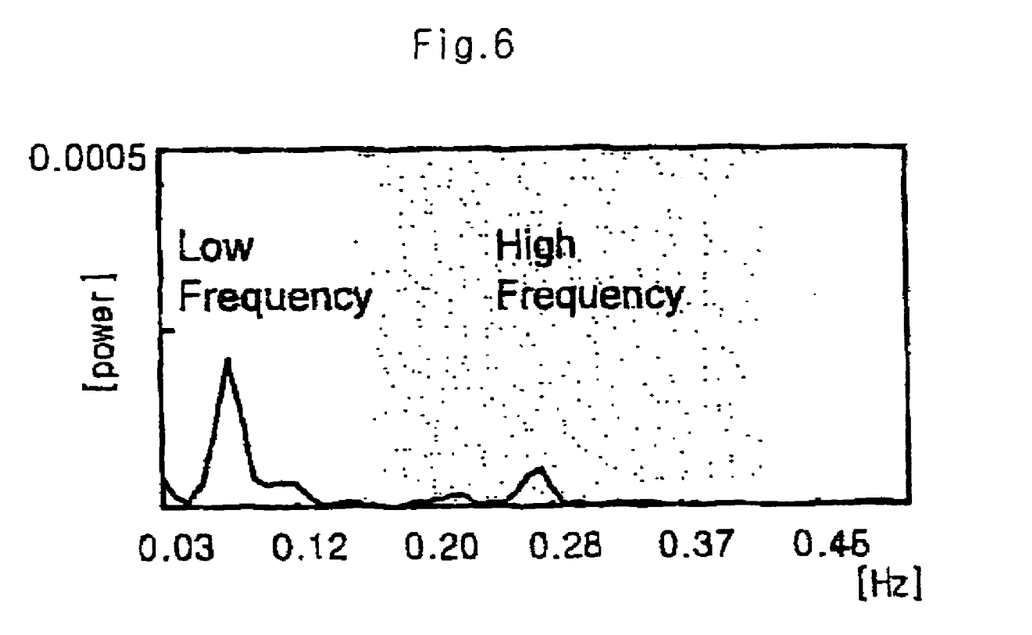
FIG. 6 illustrates a spectrum of, a heart rate variability.

The determination of the heart rate variability can be explained in detail using the spectrum of the heart rate variability shown in FIG. 6.

Referring to FIG. 6, a horizontal axis and a vertical axis represent a frequency (Hz) and a power (Power), respectively. The spectrum of the heart rate variability is divided into a high frequency area and a low frequency area on the basis of 0.15 Hz. The high frequency area is a period in which an action of sympathetic nerve is influenced, and the low frequency area is a period in which an action of parasympathetic nerve is influenced. In other words, the action of the sympathetic nerve means that the user feels nervous and unpleasant under a stress status, and thus the indoor temperature should be lowered in case a power value of the high frequency area is large. Meanwhile, since the action of the parasympathetic never means that the user is in a relaxed status, the indoor temperature need not be lowered or it should be kept in a warm status.

Preferably, as a ratio of the power value in the high frequency area to that in the low frequency area becomes higher, the user feels hotter and therefore the indoor temperature should be lowered. In other words, the ratio is divided into three periods, and weight values different from each other according to the respective periods are reflected on the personal characteristic values.

Meanwhile, the user's stress status can be evaluated using the heart rate variability. Therefore, the physical response according to the user's internal factors, not the objective indoor environment, can be found out and solved.

After the weight value is reflected according to the heart rate variability, the skin electrical activity is divided into a "DH" representing that its amplitude is large, a "DL" representing that its amplitude is small, and a "DM" representing that its amplitude is medium. The different weight values are reflected on the personal characteristic values. The control of the skin electrical activity and the indoor environment will be described in detail with reference to the analysis diagram of the skin electrical activity shown in FIG. 7.

Figure 7:
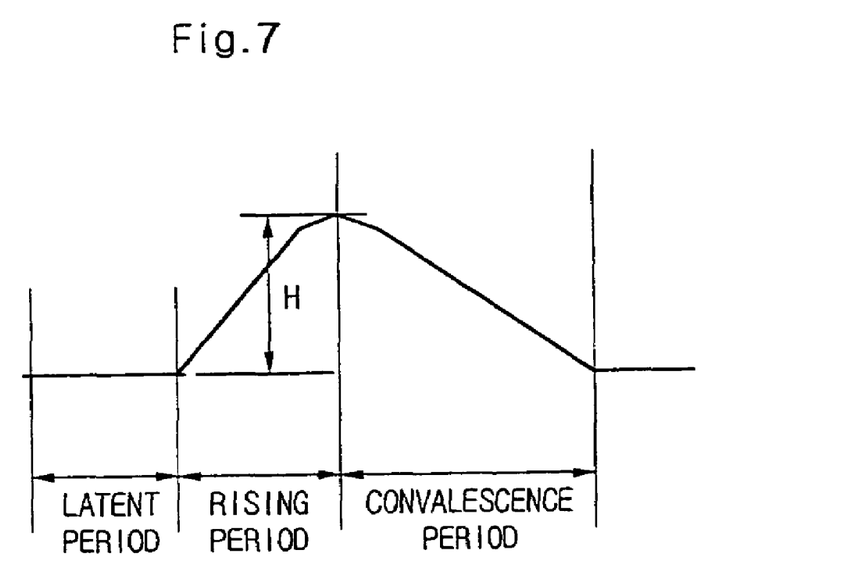
FIG. 7 illustrates an analysis diagram of a skin electrical activity.

Referring to FIG. 7, in the skin electrical activity, its amplitude H representing a response magnitude and three time periods (i.e., latent period, rising period, convalescence period) can be used as an analysis unit of the skin conductivity response.

The amplitude H increases if a secretion of sweat glands is palpated with an increase of the indoor temperature. Meanwhile, the H decreases if a secretion of sweat glands is lowered with a decrease of the indoor temperature.

As a result, in case the skin electrical activity's amplitude H is large, the indoor temperature should be lowered, and in case the skin electrical activity's amplitude H is small, the indoor temperature need not be lowered.

As described above, the respective weight values for the personal characteristic values are calculated through the above processes. At this time, the order of the steps of measuring and calculating the respective weight values can be reversed. However, since the heart rate variability is measured on the basis of the user's heart rate, the heart rate variability is calculated after measuring the user's heart rate.

The personal characteristic values are calculated through a predetermined calculation of the respective weight values (ST106).

In more detail, the personal characteristic values can be obtained by summing up respective values determined by the skin temperature, the heart rate, the spectrum of the heart rate variability and the skin electrical activity. In other words, the personal characteristic value is expressed by a following [Equation 1].

$$\text{PERSONAL CHARACTERISTIC VALUE} = A? + B? + C? + D? \quad \text{[Equation 1]}$$

Like Equation 1, the personal characteristic value can be obtained by summing up the values determined from the respective measured data. However, the personal characteristic value is not always calculated through only Equation 1. The personal characteristic value can be obtained by adding, subtracting, multiplying, or dividing additional weight values which can reflect characteristics of individual factors.

After calculating the personal characteristic value quantitatively, the air conditioner is controlled to operate according to the calculated personal characteristic values (ST107). The operation of the air conditioner according to the calculated personal characteristic value can be given by a following equation.

$$\text{INDOOR TEMPERATURE IN AIR COOLING} = W1 + ICV \times X1$$

$$\text{INDOOR WIND AMOUNT IN AIR COOLING} = W2 + ICV \times X2$$

$$\text{RIGHT/LEFT WIND DIRECTION IN AIR COOLING} = W3 + ICV \times X3$$

$$\text{UP/DOWN WIND DIRECTION IN AIR COOLING} = W4 + ICV \times X4 \quad \text{[Equation 2]}$$

where, "ICV" denotes the personal characteristic value.

At this time, the coefficients of Equation 2 can be changed according to the user's status, season, and the like.

The above Equation 2 is applicable in case only a refrigerator is installed in the single air conditioner. Meanwhile, in case a heater is further installed in the air conditioner, the air conditioner can be driven like a following equation.

$$\text{INDOOR TEMPERATURE IN AIR COOLING} = W1 + ICV \times X1$$

$$\text{INDOOR TEMPERATURE IN AIR HEATING} = Y1 + ICV \times Z1$$

$$\text{INDOOR WIND AMOUNT IN AIR COOLING} = W2 + ICV \times X2$$

$$\text{INDOOR WIND AMOUNT IN AIR HEATING} = Y2 + ICV \times Z2$$

$$\text{RIGHT/LEFT WIND DIRECTION IN AIR COOLING} = W3 + ICV \times X3$$

$$\text{RIGHT/LEFT WIND DIRECTION IN AIR HEATING} = Y3 + ICV \times Z3$$

$$\text{UP/DOWN WIND DIRECTION IN AIR COOLING} = W4 + ICV \times X4$$

$$\text{UP/DOWN WIND DIRECTION IN AIR HEATING} = Y4 + ICV \times Z4 \quad \text{[Equation 3]}$$

At this time, the coefficients of Equation 3 can be changed according to the user's status, season, and the like. For example, in case a previously inputted stature of the user is large, the up/down wind direction vane is controlled toward the upper direction. If a rapid air cooling is needed, a compressor is driven much more and also a cooling fan is driven much more so as to increase the wind amount. The present invention is not limited to the above embodiments and various methods for controlling the driving part can be implemented.

Equation 2 and Equation 3 will be described below in more detail. In the step ST106 of calculating the personal characteristic values, the personal characteristic values are quantitatively calculated using a specific equation that reflects the weight values related to the skin temperature, the heart rate, the heart rate variability and the skin electrical activity. After multiplying the personal characteristic values by the predetermined coefficients X? and Z?, other predetermined coefficients W? and Y? are added to the resultant values. By doing so, the driving value directly applicable to the air conditioner is calculated.

Meanwhile, by allowing the user to adjust the various coefficients, the air conditioner can promptly operate according to the personal characteristics.

After the air conditioner is driven according to the personal characteristic values, the personal characteristic values are re-detected according to a predetermined period or the user's selection. The user's heart rate is re-measured and new personal characteristic values are calculated, such that the air conditioner is driven in different environment. In case the re-calculation of the personal characteristic values is not wanted or not needed, the air conditioning method of the present invention is ended (ST108).

In the air conditioning system and method operating suitably to the personal characteristics, the personal characteristic values are measured quantitatively and the air conditioner operates according to the personal characteristic values, thereby enhancing the user's status more promptly and effectively.

Particularly, without depending on objectively given temperature and humidity data, the hot or cold degree that the user feels is found out using the user's physical response, considering that the degree that the individuals feel may be differently. Accordingly, it is possible to make the air conditioner operate suitably for the user's status.

What is claimed is:

1. An air conditioning system operating in accordance with a user's characteristics, comprising:

an indoor environment sensor that measures an indoor environment including a temperature;

a personal characteristic value receiver, provided in a mouse, that measures at least one of the user's heart rate, skin temperature and skin electrical activity amplitude so as to detect the user's physical status;

a controller including at least a microprocessor, that determines personal characteristic values, the personal characteristic values being used to evaluate the user's physical status on the basis of information input from the personal characteristic value receiver; and a driving device controlled by the controller, that drives at least one of a compressor and an indoor fan so as to promptly enhance the user's status.

2. An air conditioning system operating in accordance with a user's characteristics, comprising:

an indoor environment sensor and personal characteristic value receiver provided in a mouse that measures an indoor environment and the user's physical status data so as to obtain information to operate an air conditioner;

a controller including at least a microprocessor, that calculates weight values based on the physical status data measured by the personal characteristic value receiver, and calculates the user's current personal characteristic values by summing the weight values, the personal characteristic values being used to evaluate the user's physical status; and a driving device controlled by the controller, that promptly enhances the user's physical status.

3. The air conditioning system of claim 2, wherein the physical status data comprises at least one of the user's heart rate, skin temperature, and skin electrical activity.

4. An air conditioning system, comprising:

an air conditioner;

a computer which controls an operation of the air conditioner; and a cursor manipulation device, connected to the computer, comprising at least one personal characteristic sensor which takes at least one personal characteristic measurement of a user of the computer, wherein the computer controls the operation of the air conditioner based on the at least one personal characteristic measurement taken by the at least one personal characteristic value sensor.

5. The air conditioning system according to claim 4, wherein the at least one personal characteristic measurement comprises a measurement of at least one of a heart rate, a skin temperature, and a skin electrical activity of the user.

6. The air conditioning system according to claim 4, wherein the computer determines at least one weight value based on the at least one personal characteristic measurement.

7. The air conditioning system according to claim 6, wherein the computer calculates a personal characteristic value based on the at least one weight value.

8. The air conditioning system according to claim 7, wherein the at least one weight value comprises a plurality of weight values, and the computer calculates a personal characteristic value by calculating a sum of the plurality of weight values.

9. The air conditioning system according to claim 7, wherein the computer controls the operation of the air conditioner based on the personal characteristic value.

10. The air conditioning system according to claim 9, wherein the computer controls at least one of a temperature, a wind amount and a wind direction of the air conditioner based on the personal characteristic value.

11. The air conditioning system according to claim 4, wherein the cursor manipulation device comprises a mouse.

* * * * *